United States Patent
Chang et al.

(10) Patent No.: US 9,994,472 B2
(45) Date of Patent: Jun. 12, 2018

(54) TREATMENT OF THE WASTEWATER FROM ISOPHORONE PRODUCTION COMPRISING NEUTRALIZATION, FILTRATION AND A DOWNSTREAM CHEMICAL OXIDATION PROCESS AND SUBSEQUENT REDUCTION

(71) Applicant: Evonik Degussa GmbH, Essen (DE)

(72) Inventors: Yue Chang, Darmstadt (DE); Manfred Kreczinski, Herne (DE); Martin Maier, Herne (DE); Matthias Woyciechowski, Langenselbold (DE)

(73) Assignee: Evonik Degussa GmbH, Essen (DE)

( * ) Notice: Subject to any disclaimer, the term of this patent is extended or adjusted under 35 U.S.C. 154(b) by 36 days.

(21) Appl. No.: 15/296,421

(22) Filed: Oct. 18, 2016

(65) Prior Publication Data
US 2017/0107133 A1 Apr. 20, 2017

(30) Foreign Application Priority Data
Oct. 19, 2015 (EP) .................................... 15190324

(51) Int. Cl.
| | |
|---|---|
| *B01D 61/00* | (2006.01) |
| *C02F 1/44* | (2006.01) |
| *C02F 1/66* | (2006.01) |
| *C02F 1/70* | (2006.01) |
| *C02F 1/76* | (2006.01) |
| *C02F 9/00* | (2006.01) |
| *C02F 1/00* | (2006.01) |
| *C02F 103/36* | (2006.01) |
| *C02F 101/34* | (2006.01) |

(52) U.S. Cl.
CPC ................ *C02F 9/00* (2013.01); *B01D 61/00* (2013.01); *C02F 1/004* (2013.01); *C02F 1/66* (2013.01); *C02F 1/70* (2013.01); *C02F 1/76* (2013.01); *B01D 2325/02* (2013.01); *C02F 1/44* (2013.01); *C02F 2101/34* (2013.01); *C02F 2103/36* (2013.01); *C02F 2209/02* (2013.01); *C02F 2209/06* (2013.01); *C02F 2303/185* (2013.01)

(58) Field of Classification Search
CPC ..... B01D 61/00; B01D 2325/02; C02F 1/004; C02F 1/44; C02F 1/66; C02F 1/70; C02F 1/76; C02F 9/00; C02F 2101/34; C02F 2103/36; C02F 2209/02; C02F 2209/06; C02F 2303/185
See application file for complete search history.

(56) References Cited

U.S. PATENT DOCUMENTS

| 8,884,066 B2 | 11/2014 | Orschel et al. | |
|---|---|---|---|
| 2013/0261343 A1* | 10/2013 | Orschel ................... | C07C 45/74 568/347 |
| 2014/0107379 A1* | 4/2014 | Orschel ................... | C07C 45/74 568/366 |

FOREIGN PATENT DOCUMENTS

| DE | 44 28 413 A1 | 2/1996 | |
|---|---|---|---|
| WO | WO 2012076314 A1 * | 6/2012 | ............. C07C 45/74 |
| WO | WO 2012156187 A1 * | 11/2012 | ............. C07C 45/74 |

OTHER PUBLICATIONS

Extended European Search Report dated Feb. 18, 2016 in Patent Application No. 15190324.2 (with English translation of categories of cited documents).
U.S. Appl. No. 14/951,117, filed Nov. 24, 2015, Patent App. Publication No. US 2016-0152496 A1, Manfred Kreczinski, et al.
U.S. Appl. No. 15/373,949, filed Dec. 9, 2016, Yue Chang.

* cited by examiner

*Primary Examiner* — Lucas Stelling
(74) *Attorney, Agent, or Firm* — Grüneberg and Myers PLLC

(57) ABSTRACT

Treatment of the wastewater from isophorone production comprising neutralization, filtration and a downstream chemical oxidation process and subsequent reduction.

The invention relates to treatment of the wastewater from isophorone (IP) production comprising neutralization, filtration and a downstream chemical oxidation process and subsequent reduction.

14 Claims, No Drawings

TREATMENT OF THE WASTEWATER FROM ISOPHORONE PRODUCTION COMPRISING NEUTRALIZATION, FILTRATION AND A DOWNSTREAM CHEMICAL OXIDATION PROCESS AND SUBSEQUENT REDUCTION

BACKGROUND OF THE INVENTION

Field of the Invention

The invention relates to treatment of the wastewater from isophorone (IP) production comprising neutralization, filtration and a downstream chemical oxidation process and subsequent reduction.

Discussion of the Background

WO2012/076314 discloses a method of preparing isophorone (3,5,5-trimethyl-2-cyclohexen-1-one).

WO2012/076314 and WO 2012/156187 disclose a method of preparing isophorone wherein the water from the bottoms of the distillative treatment of the aqueous fraction is subjected to a flash evaporation and the purified water generated is recycled into the process for preparing isophorone. The wastewater generated is not purified further.

The european patent application having filing number 14195357.0-1351 describes a method of treating impurified wastewater from the preparation of isophorone (IP), isophoronenitrile (IPN) and isophoronediamine (IPDA), wherein the wastewater from the preparation of isophorone may be treated by an oxidation.

SUMMARY OF THE INVENTION

The present invention has for its object to improve wastewater quality compared to the prior art.

It was found that solids formation from the wastewater from isophorone production is enhanced by neutralization by means of pH adjustment from pH 12 to pH 6.5 to 8.5 and that the precipitated solids can be separated by filtration and also that the dissolved organic ingredients in the wastewater can be digested by a chemical oxidation. This treatment can substantially improve the biodegradability of the wastewater from IP production.

DETAILED DESCRIPTION OF THE INVENTION

The invention provides a method of treating the wastewater from isophorone production by
A) neutralization of the alkaline wastewater from isophorone production to a pH of 6.5 to 8.5;
B) filtration of the mixture of liquid and solids obtained from the neutralization;
C) oxidation of the filtrate obtained from the filtration;
D) reduction of the oxidant in the wastewater from the oxidation.

Neutralization A)

The wastewater from isophorone production is a wastewater comprising solids and a great many complex organic compounds. This wastewater is highly basic and usually has a pH higher than 13. Therefore, preferably after distillative treatment as described for example in WO2012/076314 and WO 2012/156187, the wastewater from IP production is subjected in a first step to a neutralization.

Organic compounds form solids during cooling of the wastewater. This solids formation is enhanced when the pH of the wastewater is adjusted towards the neutral range (pH 7). The invention provides an upstream neutralization before the wastewater is discharged to municipal drain because the pH range for indirect introduction into wastewater is typically from 6.5 to 8.5. The wastewater additionally has only a limited biodegradability, i.e. <60%, even after long adaptation times in municipal water treatment plants.

In the prior art such as in WO2012/076314 and WO 2012/15618, the wastewater from production is treated as described therein and discharged to drain.

It was found that sufficient amounts of solids can be formed at pH 6.5-8.5. Both in-line methods and stationary neutralization methods may be employed to this end. In in-line neutralization methods the acids are admixed to the wastewater via a static mixer. In the stationary neutralization method the acids are admixed to the wastewater in a container using a stirrer.

The IP wastewater is a buffering wastewater which is highly dependent on process stability upstream of the wastewater stripper and the stationary neutralization method is accordingly preferable therefor.

All mineral and organic acids may be used as the acids for neutralization. Sulfuric acid is preferred therefor for efficient neutralization.

According to the invention the neutralization may generally be carried out under atmospheric or superatmospheric pressure at temperatures of 0° C. to 100° C. and at pH 6.5 to 8.5.

The neutralization is preferably carried out at atmospheric pressure in the temperature range of 20-40° C. and at pH 7 to 7.5, particularly preferably at pH 7.0-7.25, in order that the maximum amount of solids may be formed.

It is preferable when the metering of acids is effected in two stages such that the first metering stage is carried out with concentrated acid, preferably 90-96 wt % $H_2SO_4$ or 30-35 wt % HCl, just above the vertex of the pH lowering which as per the operating state is between pH 11-10.5 and in the second metering stage dilute acid, preferably 5-15 wt % $H_2SO_4$ or 5-10 wt % HCl, is then used to slowly approach pH 7-7.2.

Filtration B)

In a second step B) filtration of the mixture of liquid and solids obtained from the neutralization is effected.

The filtration may be carried out in one or more filtration apparatuses. The neutralized wastewater comprising formed solids is introduced into an atmospheric pressure filtration. The solids are fine flakes which may be crushed under high pressure or mechanical stress. The aqueous phase ultimately passes through the filter under gravity to leave the solids behind. Solids continue to be left behind and do not cause any deposits and blockages in downstream apparatuses and pipes. The filtration of the solids reduces 20-60% of organic compounds in the form of solids. After a further dewatering the filtercakes may be sent for special, but substantially more cost-effective, disposal.

The solids are very readily separated off during the filtration. The pore size of the filters may vary from 0.1-25 μm. Preference is given to filters with a pore size of 0.5-2 μm. The filtration may be effected with candle filters, bag filters or the like. The bag filter is preferably in a housing having multiple inserts.

The filtration may be carried out at atmospheric pressure or superatmospheric pressure at temperatures of 15° C. to 45° C. in an apparatus or a plurality of apparatuses and these may be arranged in parallel and/or in series. The filtration is preferably carried out at temperatures of 20° C. to 30° C.

It is preferable to carry out the filtration at atmospheric pressure and at temperatures from 20° C. to 30° C. The solids are very readily separated off in an atmospheric pressure filtration with a pore size below 10 μm, in particular of 1 μm (ultra- to nanofiltration). The atmospheric pressure filtration may be effected with a bag filter, candle filter or the like. The aqueous phase passes through the filter and the solids are left behind to form filtercakes. The bag filter is preferably in a housing having multiple inserts.

Depending on the filtration method, the filtercakes may be dewatered by means of compressed air introduction at the end of the filtration procedure. The end of the filtration procedure is evident on account of an increase in pressure in the filter housing. The filtercakes are disposed of as special waste.

The filtrate does not cause any deposits and blockages in downstream apparatuses and pipes. The filtration of the solids reduces up to 60% of the total organic compounds measured as CSB as per DIN 38 409-H41, or alternatively by Hach-Lange cuvette tests (total chemical oxygen demand).

Oxidation C)

In an oxidative pretreatment complex organic compounds in the wastewater are digested and directly oxidized to afford primarily CO2 and water.

The filtrate comprises further organic compounds which cannot be reduced by upstream precipitation and filtration. In a third step C) the organic compounds are treated via a chemical oxidation by addition of oxidants, preferably sodium hypochlorite. The filtrate is introduced into the oxidation reactor, a 5-15 wt % solution comprising at least one oxidant, preferably sodium hypochlorite solution, being added into the feed conduit thereof. The reaction pH range during the oxidation varies between pH 7-8. The reaction temperature is 20-45° C. The employed amounts of the solution comprising the oxidant, preferably sodium hypochlorite solution, depend on the concentration of the solution and the amounts of the organic compounds, measured as CSB. The metering range is preferably 50-85 mL (max 100 mL) of 10 wt % NaOCL solution per gram of CSB.

The reaction may be carried out in continuous or batch-wise fashion as a single- or multistage through-flow process. The hydraulic residence time is 2 to 8 hours. A multistage continuous reactor concept is particularly preferred here, at least two reactors being arranged in series. During the reaction the pH and temperature monitoring and the metering of the solution comprising the oxidant, preferably NaOCL solution, are preferably controlled continuously via online sensors. Should online monitoring not be possible, regular test samples may be analysed in order to allow optimal control of the process.

Should wastewaters other than IP wastewater from step B) arrive in the oxidation appropriate pH adjustment to the reaction must be tested and adhered to. In the present case wastewaters from the production of isophoronenitrile (IPN) and/or isophoronediamine (IPDA) are fed into IP wastewater. Since both bound and free cyanides are present in wastewaters from IPN and IPDA, the chemical oxidation comprising addition of oxidants, preferably sodium hypochlorite, must be effected at pH>9.5 so that no HCN gas is stripped out during the oxidation.

Reduction D)

After the oxidation the remaining oxidant is reduced in a fourth step D). Suitable are in principle reductants that can reduce the employed oxidant.

The preferred sodium hypochlorite is reduced with Na2SO3 so that the oxidant sodium hypochlorite does not trigger unexpected reactions in downstream processes.

In the best case organic compounds are oxidized by hypochlorite compounds to afford NH4, CO2 and H2O and also halogenated compounds. In the normal case complex organic compounds are oxidized to afford simpler organic compounds, NH4, CO2 and H2O and also halogenated compounds.

Compared to freshly generated and untreated wastewater this method improves the overall biodegradability of the IP wastewater by 10 to 20%, measured according to standard methods of measurement (Zahn-Wellens test DIN EN ISO 9888/OECD302B).

Having generally described this invention, a further understanding can be obtained by reference to certain specific examples which are provided herein for purposes of illustration only, and are not intended to be limiting unless otherwise specified.

European patent application 15190324.2 filed Oct. 19, 2015, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A method of treating the wastewater from isophorone production by
    A) neutralization of the alkaline wastewater from isophorone production to a pH of 6.5 to 8.5;
    B) filtration of the mixture of liquid and solids obtained from the neutralization;
    C) oxidation of the filtrate obtained from the filtration;
    D) reduction of an oxidant in the wastewater from the oxidation C).

2. The method according to claim 1, wherein the neutralization A) is carried out by an in-line method or by a stationary neutralization method.

3. The method according to claim 1, wherein the neutralization A) is carried out by a stationary neutralization method, wherein the acids are admixed to the wastewater in a container using a stirrer.

4. The method according to claim 1, wherein the neutralization A) is carried out at atmospheric pressure in the temperature range of 20-40° C. and at pH 7 to 7.5.

5. The method according to claim 1, wherein in the neutralization A) the metering of acids is effected in two stages such that the first metering stage is carried out with concentrated acid just above the vertex of the pH lowering which as per the operating state is between pH 11-10.5 and in the second metering stage dilute acid is then used to slowly approach pH 7-7.2.

6. The method according to claim 1, wherein in the neutralization A) the metering of acids is effected in two stages such that the first metering stage is carried out with 90-96 wt % $H_2SO_4$ or 30-35 wt % HCl just above the vertex of the pH lowering which as per the operating state is between pH 11-10.5 and in the second metering stage preferably 5-15 wt % $H_2SO_4$ or 5-10 wt % HCl is then used to slowly approach pH 7-7.2.

7. The method according to claim 1, wherein the filtration B) is carried out at atmospheric pressure or superatmospheric pressure at temperatures of 15° C. to 45° C.

8. The method according to claim 1, wherein the filtration B) is carried out at atmospheric pressure at temperatures of 20° C. to 30° C. using a filter with a pore size below 10 μm, in particular of 1 μm.

9. The method according to claim 1, wherein the reaction pH range during the oxidation C) varies between pH 7-8 and the reaction temperature varies between 20-45° C.

10. The method according to claim 1, wherein the oxidation C) is carried out by a 5-15 wt % solution comprising at least one oxidant.

11. The method according to claim 1, wherein the oxidation is carried out by a 5-15 wt % solution comprising sodium hypochlorite.

12. The method according to claim 1, wherein the oxidation C) is carried out in continuous fashion as a multistage through-flow process.

13. The method according to claim 1, wherein the oxidant is reduced with $Na_2SO_3$ in step D).

14. The method according to claim 1, wherein wastewaters from the production of isophoronenitrile (IPN) and/or isophoronediamine (IPDA) are fed with the isophorone wastewater from step B) into the oxidation C), the oxidation being effected at pH>9.5.

* * * * *